United States Patent
Nishida et al.

(10) Patent No.: US 7,062,929 B2
(45) Date of Patent: Jun. 20, 2006

(54) VEHICLE AIR CONDITIONER WITH VAPOR-COMPRESSION REFRIGERANT CYCLE AND METHOD OF OPERATING THE SAME

(75) Inventors: Shin Nishida, Anjo (JP); Yoshitaka Tomatsu, Chiryu (JP)

(73) Assignee: DENSO Corporation, Kariya (JP)

( * ) Notice: Subject to any disclaimer, the term of this patent is extended or adjusted under 35 U.S.C. 154(b) by 421 days.

(21) Appl. No.: 10/655,260

(22) Filed: Sep. 4, 2003

(65) Prior Publication Data

US 2004/0069011 A1 Apr. 15, 2004

(30) Foreign Application Priority Data

Sep. 9, 2002 (JP) ............................. 2002-262964

(51) Int. Cl.
*F25B 19/02* (2006.01)
*F25B 1/06* (2006.01)

(52) U.S. Cl. .......................................... 62/170; 62/500
(58) Field of Classification Search .................. 62/500, 62/170
See application file for complete search history.

(56) References Cited

U.S. PATENT DOCUMENTS

| 6,779,360 B1 * | 8/2004 | Kawamura et al. ........... 62/500 |
| 6,910,343 B1 * | 6/2005 | Ozaki et al. .................. 62/191 |
| 6,941,768 B1 * | 9/2005 | Ikegami et al. ............... 62/500 |
| 6,966,199 B1 * | 11/2005 | Takeuchi ....................... 62/500 |
| 2001/0025499 A1 * | 10/2001 | Takeuchi et al. .............. 62/175 |
| 2003/0200764 A1 * | 10/2003 | Takeuchi et al. .............. 62/500 |
| 2004/0040340 A1 * | 3/2004 | Takeuchi et al. .............. 62/500 |

FOREIGN PATENT DOCUMENTS

JP          03087549        * 4/1991

* cited by examiner

*Primary Examiner*—William C. Doerrler
(74) *Attorney, Agent, or Firm*—Harness, Dickey & Pierce, PLC

(57) ABSTRACT

An air-conditioner includes a compressor, a radiator, an evaporator, an ejector, and a separator. The compressor compresses refrigerant and variably controls an amount of the refrigerant. The radiator cools high-pressure refrigerant. The evaporator cools air blowing into a passenger compartment of a vehicle. The ejector having a nozzle jets the refrigerant at high speed. The separator separates the refrigerant into gas refrigerant and liquid refrigerant. An opening degree of a throttle of the nozzle in the ejector becomes larger so as to increase a cooling performance of the air-conditioner when the amount of the refrigerant discharged from the compressor is smaller than a maximum amount of the refrigerant.

20 Claims, 3 Drawing Sheets

VEHICLE AIR CONDITIONER WITH VAPOR-COMPRESSION REFRIGERANT CYCLE AND METHOD OF OPERATING THE SAME

CROSS REFERENCE TO RELATED APPLICATION

This application is based on Japanese Patent Application No. 2002-262964 filed on Sep. 9, 2002, the disclosure of which is incorporated herein by reference.

FIELD OF THE INVENTION

The present invention relates to an air conditioner with a vapor-compression refrigerant cycle. Specifically, the present invention relates to an ejector cycle of the vapor-compression refrigerant cycle, which provides to transfer heat of a low-temperature side to a high-temperature side. The air conditioner is suitably used for a vehicle.

BACKGROUND OF THE INVENTION

An ejector cycle of a vapor-compression refrigerant cycle in an air-conditioner for a vehicle is performed by an ejector. In the ejector cycle, the ejector decompresses and expands high-pressure refrigerant so that suction pressure of a compressor is increased in accordance with converting expansion energy to pressure energy and that refrigerant of a low-pressure side circulates by a pumping operation of the ejector.

Here, the pumping operation of the ejector provides a momentum transportation type pumping, which performs to suck fluid by jetting the refrigerant at high speed, as described in Japan Industrial Standard Z 8126 No. 2.1.2.3. This pumping performance of the ejector changes in accordance with an opening degree of a throttle of a nozzle in the ejector. When the opening degree of the throttle is fixed, the pumping performance of the ejector is limited. In some cases, the ejector may not send the refrigerant to the evaporator sufficiently, so that the cooling performance of the air-conditioner becomes short.

Moreover, when the cooling performance of the air-conditioner reduces, a dehumidifying performance of the air-conditioner also reduces, so that a windshield of the vehicle may be fogged.

SUMMARY OF THE INVENTION

In view of the above problem, it is an object of the present invention to provide a new air-conditioner, specifically, a new conditioner having sufficient cooling performance.

Further, it is another object of the present invention to provide a method of operating a new air-conditioner having sufficient cooling performance.

An air-conditioner with a vapor-compression refrigerant cycle includes a compressor for sucking and compressing refrigerant and for variably controlling an amount of the refrigerant discharged from the compressor per unit of time, a radiator for radiating heat and cooling high-pressure refrigerant compressed by the compressor, an evaporator for cooling air blowing into a passenger compartment of a vehicle by evaporating the refrigerant, an ejector having a nozzle with an opening degree of a throttle for jetting the refrigerant at high speed by decompressing and expanding the high-pressure refrigerant at the nozzle so that low-pressure refrigerant is circulated by jetting the refrigerant and that suction pressure of the compressor is increased by converting expansion energy to pressure energy, and a separator for separating the refrigerant jetted from the ejector into gas refrigerant and liquid refrigerant so that the gas refrigerant is supplied to a suction side of the compressor and the liquid refrigerant is supplied to the evaporator. The opening degree of the throttle of the nozzle in the ejector becomes larger so as to increase a cooling performance of the air-conditioner when the amount of the refrigerant discharged from the compressor is smaller than a maximum amount of the refrigerant discharged from the compressor.

The above air-conditioner is a new air-conditioner having sufficient cooling performance. Moreover, the increase of the cooling performance performs to eliminate the fog of the windshield immediately, and performs to obtain a required cooling performance immediately.

Preferably, the opening degree of the throttle of the nozzle in the ejector becomes larger, and simultaneously the amount of the refrigerant discharged from the compressor is increased so as to increase a cooling performance of the air-conditioner when the amount of the refrigerant discharged from the compressor is smaller than the maximum amount of the refrigerant discharged from the compressor.

Preferably, the amount of the refrigerant discharged from the compressor is increased after the opening degree of the throttle of the nozzle in the ejector becomes larger so as to increase a cooling performance of the air-conditioner when the amount of the refrigerant discharged from the compressor is smaller than the maximum amount of the refrigerant discharged from the compressor.

Preferably, the opening degree of the throttle of the nozzle in the ejector is increased after the amount of the refrigerant discharged from the compressor is increased so as to increase a cooling performance of the air-conditioner when the amount of the refrigerant discharged from the compressor is smaller than the maximum amount of the refrigerant discharged from the compressor.

Further, a method for operating an air-conditioner with a vapor-compression refrigerant cycle is provided. Here, the air-conditioner includes a compressor for sucking and compressing refrigerant and for variably controlling an amount of the refrigerant discharged from the compressor per unit of time, a radiator for radiating heat and cooling high-pressure refrigerant compressed by the compressor, an evaporator for cooling air blowing into a passenger compartment of a vehicle by evaporating the refrigerant, an ejector having a nozzle with an opening degree of a throttle for jetting the refrigerant at high speed by decompressing and expanding the high-pressure refrigerant at the nozzle so that low-pressure refrigerant is circulated by jetting the refrigerant and that suction pressure of the compressor is increased by converting expansion energy to pressure energy, and a separator for separating the refrigerant jetted from the ejector into gas refrigerant and liquid refrigerant so that the gas refrigerant is supplied to a suction side of the compressor and the liquid refrigerant is supplied to the evaporator. The method includes the steps of enlarging the opening degree of the throttle of the nozzle in the ejector so as to increase a cooling performance of the air-conditioner, and increasing an amount of the refrigerant discharged from the compressor.

The above method of operating the air-conditioner provides sufficient cooling performance. Moreover, the increase of the cooling performance performs to eliminate the fog of the windshield immediately, and performs to obtain a required cooling performance immediately.

Preferably, the amount of the refrigerant discharged from the compressor is smaller than a maximum amount of the refrigerant discharged from the compressor.

Preferably, the step of enlarging the opening degree of the throttle of the nozzle is performed before the step of increasing the amount of the refrigerant discharged from the compressor.

Preferably, the step of enlarging the opening degree of the throttle of the nozzle is performed after the step of increasing the amount of the refrigerant discharged from the compressor.

Preferably, the step of enlarging the opening degree of the throttle of the nozzle and the step of increasing the amount of the refrigerant discharged from the compressor are performed simultaneously.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
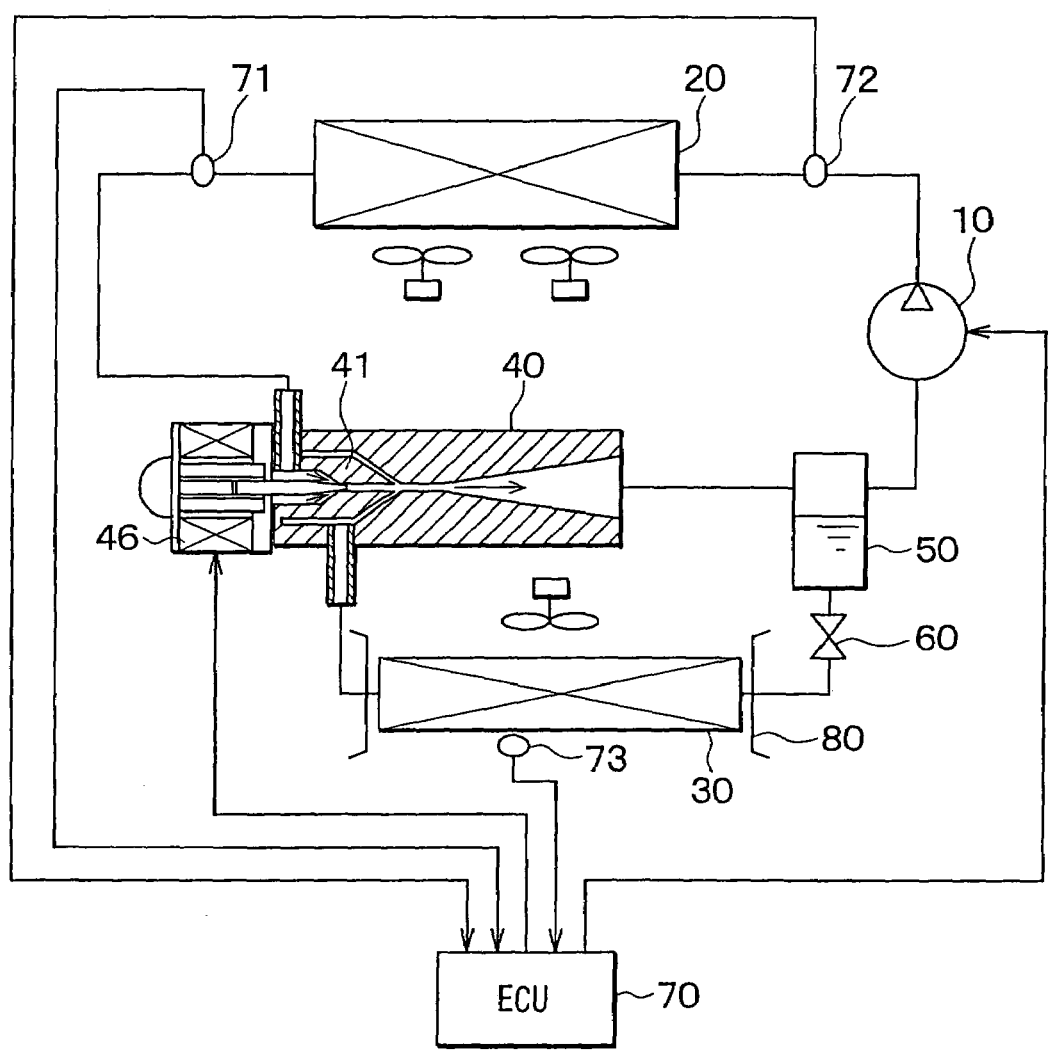
FIG. 1 is a schematic diagram showing an air-conditioner with a vapor-compression refrigerant cycle, according to a first embodiment of the present invention.

An air-conditioner with a vapor compression refrigerant cycle according to a first embodiment of the present invention is shown in FIG. 1. The air-conditioner includes an ejector 40, so that the vapor compression refrigerant cycle provides an ejector cycle.

The air-conditioner with the ejector cycle includes a compressor 10, a radiator 20, an evaporator 30, the ejector 40, a separator 50, a throttle 60, an electronic control unit (i.e., ECU) 70, a temperature sensor 71, a pressure sensor 72, and an evaporation sensor 73. The compressor 10 is a variable displacement compressor operated by a driving force from a driving engine, and is used as a pumping means for sucking and compressing refrigerant. The radiator 20 as a high-pressure side heat exchanger exchanges heat between the refrigerant discharged from the compressor 10 and the outside air outside a passenger compartment of a vehicle so that the radiator 20 cools the refrigerant.

In this embodiment, the refrigerant is carbon dioxide, and when an air-conditioning load is large, for example, in the summer season in which the atmospheric temperature is high, discharge pressure of the refrigerant increases larger than the critical pressure of the refrigerant. The discharge pressure of the refrigerant discharged from the compressor 10 is refrigerant pressure of a high-pressure side.

The evaporator 30 is accommodated in an air-conditioner casing 80. The evaporator 30 exchanges heat between the air blowing into the compartment and liquid refrigerant so that the liquid refrigerant is evaporated and the air blowing into the compartment is cooled. The evaporator 30 is used as a low-pressure side heat exchanger.

Figure 2:
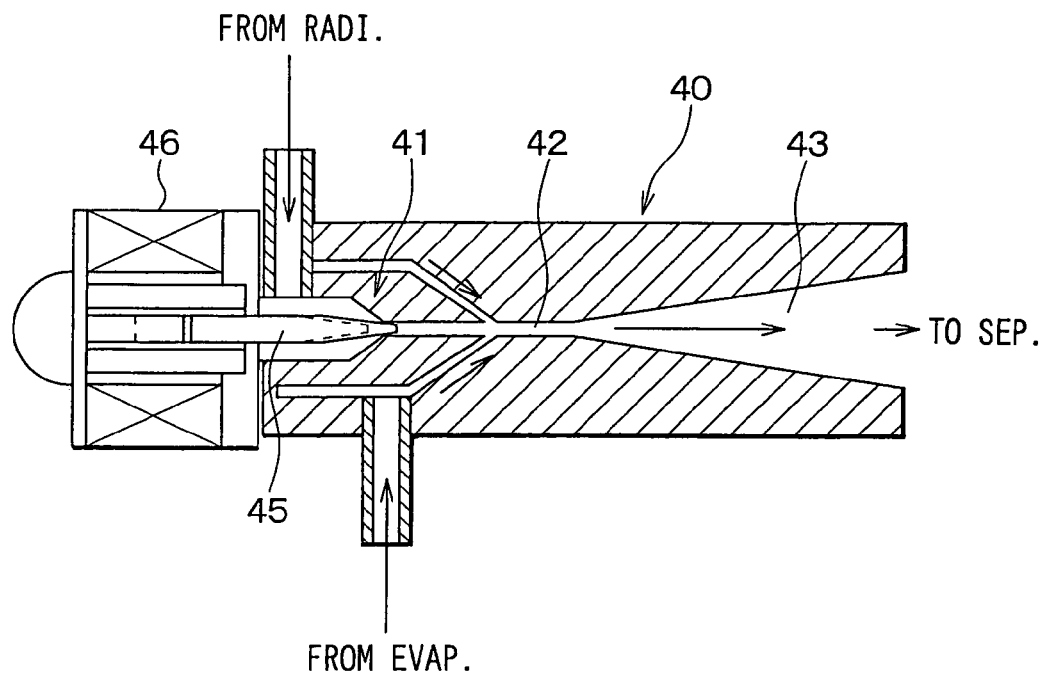
FIG. 2 is a schematic cross-sectional view showing an ejector, according to the first embodiment.

The ejector 40 decompresses and expands the refrigerant, so that gas refrigerant is sucked and suction pressure of the compressor 10 is increased in accordance with converting expansion energy to pressure energy. Here, the gas refrigerant is evaporated in the evaporator 30. As shown in FIG. 2, the ejector 40 includes a nozzle 41, a mixer 42, a diffuser 43, a needle valve 45, an actuator 46, and the like.

The nozzle 41 converts the pressure energy of the high-pressure refrigerant introduced into the ejector 40 to velocity energy so that the nozzle 41 decompresses and expands the refrigerant in iso-entropy. The mixer 42 mixes the gas refrigerant evaporated in the evaporator 30 and refrigerant flow jetted from the nozzle 41. The gas refrigerant is sucked by the refrigerant flow jetted from the nozzle 41 at high speed. The diffuser 43 increases the refrigerant pressure by converting the velocity energy to the pressure energy in accordance with mixing the refrigerant sucked from the evaporator 30 and the refrigerant jetted from the nozzle 41. The needle valve 45 changes an opening degree of a throttle of the nozzle 41. The actuator 46 is composed of a step motor and the like. The step motor drives the needle valve 45 in a longitudinal direction. When the needle valve 45 is moved to the left side of the ejector 40, i.e., in a direction away from the mixer 42, the opening degree of the throttle of the nozzle 41 becomes large. When the needle valve 45 is moved to the right side of the ejector 40, i.e., in a direction close to the mixer 42, the opening degree of the throttle of the nozzle 41 becomes small.

In this embodiment, a Laval nozzle (See "fluid mechanics" published by University of Tokyo Press) is used as the nozzle 41 so that velocity of the refrigerant jetted from the nozzle 41 is accelerated up to a supersonic velocity. The Laval nozzle 41 has a throat, a passage area of which is narrowed and minimized in all passage.

The refrigerant flows from the ejector 40 into the separator 50. The separator 50 separates the refrigerant into the gas refrigerant and the liquid refrigerant, so that the separator 50 accumulates the liquid refrigerant. An outlet of the separator 50, which is for the gas refrigerant, connects to a suction side of the compressor 10. Another outlet of the separator 50, which is for the liquid refrigerant, connects to an inlet of the evaporator 30.

The throttle 60 decompresses the liquid refrigerant flown from the separator 50.

The temperature sensor 71 detects temperature of the refrigerant just after being flown from the radiator 20. The pressure sensor 72 is disposed on the discharge side of the compressor 10, and detects pressure of the high-pressure side refrigerant discharged from the compressor 10 (i.e., discharge pressure). The evaporation sensor 73 detects temperature of the air just after passing through the evaporator 30 so that the evaporation sensor 73 senses the cooling performance of the air-conditioner indirectly.

The ECU 70 reads the detected values of the sensors 71–73, other detected values, and a setting value. The other detected values are detected by an inside air temperature sensor for detecting temperature of the inside air inside the compartment and by an outside air temperature sensor for detecting atmospheric temperature outside the compartment. The setting value of inside air temperature is set by a passenger in the compartment. Then, the ECU 70 controls the opening degree of the throttle of the nozzle 41, i.e., the ECU 70 controls the actuator 46 and a displacement of the compressor 10 according to a predetermined program based on the above values. Here, the displacement means a theoretical displacement discharged from a discharge port of the compressor 10 by one rotation cycle of a shaft in the compressor 10. For example, in a piston type compressor such as a swash plate compressor, the theoretical displacement is defined geometrically by a bore diameter and a stroke length.

The ejector cycle is operated as follows.

The compressor 10 discharges the refrigerant to the radiator 20. The radiator 20 cools the refrigerant. Then, the nozzle 41 of the ejector 40 decompresses and expands the refrigerant in iso-entropy, so that the refrigerant is accelerated up to the supersonic velocity. The accelerated refrigerant flows into the mixer 42. The mixer 42 sucks the refrigerant evaporated in the evaporator 30 by the pumping operation of the high-speed refrigerant jetted into the mixer 42. By this pumping operation, the low-pressure side refrigerant circulates through the separator 50, the throttle 60, the evaporator 30, the ejector (i.e., compression means) 40, and the separator 50, in this order.

On the other hand, the refrigerant sucked from the evaporator 30 into the ejector 40, i.e., the suction refrigerant and the refrigerant jetted from the nozzle 41, i.e., the jet refrigerant are mixed at the mixer 42. Here, the jet refrigerant is inputted from the radiator 20. Then, the mixed refrigerant flows into the diffuser 43 shown in FIG. 2, so that dynamical pressure of the mixed refrigerant is converted to static pressure. Then, the refrigerant returns to the separator 50. At that time, at the mixer 42, the jet refrigerant and the suction refrigerant are mixed so as to reserve a total momentum of the jet refrigerant and the suction refrigerant. Therefore, the refrigerant pressure at the mixer 42 (i.e., the static pressure) also increases.

A cross section of passage of the diffuser 43 is gradually increased as the passage goes to the downstream. Therefore, the velocity energy (i.e., the dynamical pressure) of the refrigerant is converted to the pressure energy (i.e., the static pressure). Thus, the refrigerant pressure increases at both the mixer 42 and the diffuser 43 in the ejector 40. Therefore, both the mixer 42 and the diffuser 43 are called a compression unit. According to the ideal ejector 40, the refrigerant pressure increases at the mixer 42 so as to reserve a total momentum of the jet refrigerant and the suction refrigerant, and also increases at the diffuser 43 so as to reserve the energy.

Next, a control method and its effect are described as follows.

Figure 3:
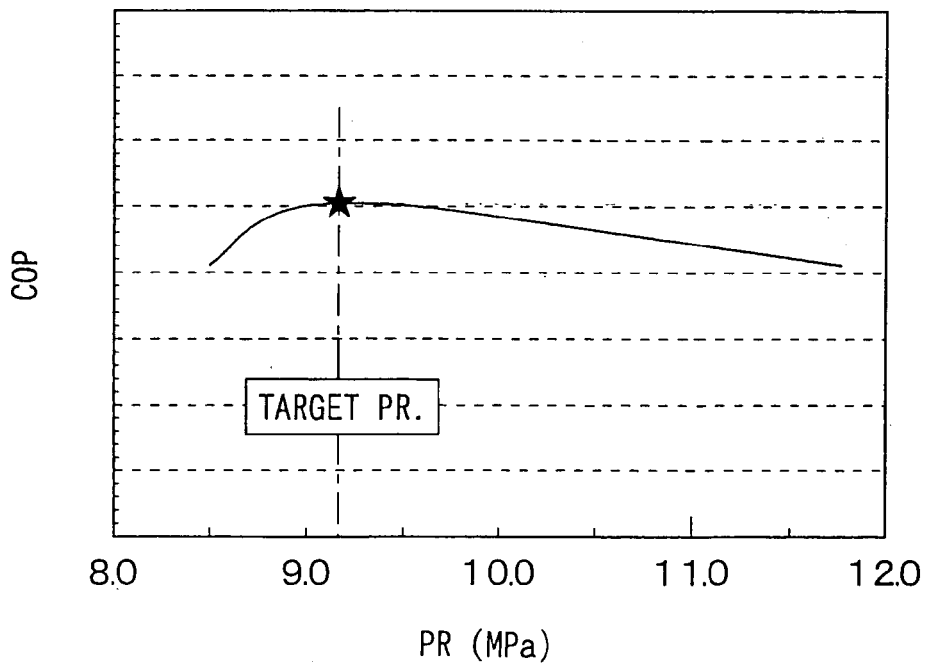
FIG. 3 is a graph showing a relationship between COP and PR, according to the first embodiment.

In a season, in which the air-conditioner is not required to have a large cooling performance, for example, in fall, winter, spring, and a rainy season, the compressor 10 is operated such that the discharge pressure of the compressor 10 becomes smaller than the maximum discharge pressure. Further, the opening degree of the throttle of the nozzle 41 is controlled such that the refrigerant pressure of the high-pressure side, i.e., the detected pressure of the pressure sensor 72 becomes a target pressure. The target pressure is determined based on the refrigerant temperature of the outlet side of the radiator 20, i.e., the detected temperature of the temperature sensor 71. Here, the target pressure in each detected refrigerant temperature is determined such that a coefficient of performance (i.e., COP) of the air-conditioner becomes the largest theoretically, as shown in FIG. 3.

When the windshield is fogged in accordance with a change of the vehicle's driving environment, when the passenger selects a defog mode, which provides an air-conditioning air blowing toward the windshield, or when the detected temperature of the evaporation sensor 73 is increased so that the cooling performance of the evaporator 30 is decreased, the opening degree of the throttle of the nozzle 41 becomes larger so that the cooling performance of the evaporator 30 is increased. Then, the displacement of the compressor 10 is increased. This increase of the cooling performance performs to eliminate the fog of the windshield immediately, and performs to obtain a required cooling performance immediately.

When the opening degree of the throttle of the nozzle 41 becomes larger, the refrigerant pressure of the high-pressure side becomes smaller than the target pressure temporarily. However, after the opening degree of the throttle of the nozzle 41 becomes larger, the displacement of the compressor 10 is increased immediately. Therefore, the reduced refrigerant pressure of the high-pressure side can be recovered immediately. Thus, the coefficient of performance of the air-conditioner is not reduced substantially.

In this embodiment, the opening degree of the throttle of the nozzle 41 becomes larger so that the cooling performance of the evaporator 30 becomes large. Then, the displacement of the compressor 10 becomes larger, so that the refrigerant pressure of the high-pressure side is recovered immediately. After that, the opening degree of the throttle of the nozzle 41 is controlled again such that the refrigerant pressure of the high-pressure side becomes the target pressure, which is determined based on the refrigerant temperature of the outlet of the radiator 20.

Here, in the ejector cycle, the refrigerant is circulated through the evaporator 30 by the pumping operation of the ejector 40. Therefore, the amount of the refrigerant flowing to the evaporator 30 increases as the opening degree of the throttle of the nozzle 41 becomes large. This increase of the amount of the refrigerant is larger than that by increasing the displacement of the compressor 10. Therefore, after the opening degree of the throttle of the nozzle 41 becomes large, the displacement of the compressor 10 becomes large so that the amount of the refrigerant discharged from the compressor 10 per unit of time is increased Second Embodiment When the windshield of the vehicle is fogged in accordance with the change of the driving environment, when the passenger selects the defog mode, which provides to blow the air-conditioning air toward the windshield, or when the detected temperature of the evaporation sensor 73 becomes large so that the cooling performance of the evaporator 30 is reduced, the displacement of the compressor 10 is increased so that the amount of the refrigerant discharged from the compressor 10 per unit of time is increased. Then, the opening degree of the throttle of the nozzle 41 is increased.

Third Embodiment

When the windshield of the vehicle is fogged in accordance with the change of the driving environment, when the passenger selects the defog mode, which provides to blow the air-conditioning air toward the windshield, or when the detected temperature of the evaporation sensor 73 is increased so that the cooling performance of the evaporator 30 is reduced, the opening degree of the throttle of the nozzle 41 is increased, and simultaneously the displacement of the compressor 10 is increased so that the amount of the refrigerant discharged from the compressor 10 per unit of time is increased.

Fourth Embodiment

Although the amount of the refrigerant discharged from the compressor 10 per unit of time is controlled by controlling the displacement of the compressor 10, which is the variable displacement type compressor, the amount of the refrigerant discharged from the compressor 10 per unit of time can be controlled by controlling the rotation speed of the compressor 10. In this case, the compressor 10 is driven by a special driving unit such as an electric motor.

When the amount of the refrigerant discharged from the compressor 10 per unit of time is increased, the rotation speed of the compressor 10 is increased. When the amount of the refrigerant discharged from the compressor 10 per unit of time is decreased, the rotation speed of the compressor 10 is reduced.

Fifth Embodiment

Figure 4:
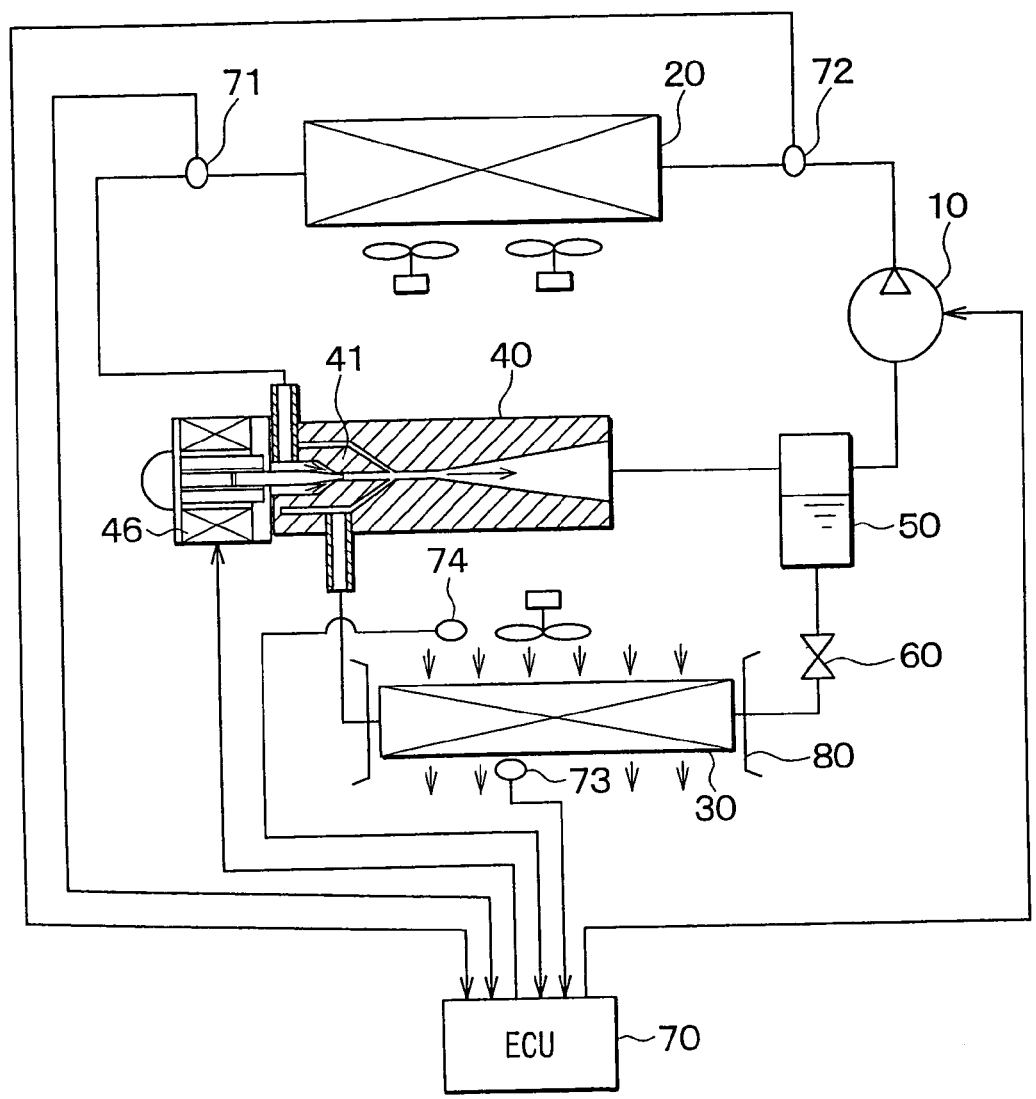
FIG. 4 is a schematic diagram showing an air-conditioner with a vapor-compression refrigerant cycle, according to a fourth embodiment of the present invention.

As shown in FIG. 4, an air-conditioner further includes a humidity sensor 74, which detects humidity of the air being sucked into the air-conditioner casing 80. When the detected humidity of the humidity sensor 74 becomes larger than a predetermined humidity, the ECU 70 determines that the possibility of the windshield being fogged is comparably high. Then, the cooling performance of the compressor 10 is increased, so that the increase of the cooling performance is larger than that in a case where the detected humidity of the humidity sensor 74 is equal to or smaller than the predetermined humidity.

(Modifications)

Although the refrigerant is carbon dioxide, another refrigerant such as freon, hydrocarbon, hydro chloro carbon (i.e., HFE), and hydro fluoro carbon (i.e., HFC) can be used.

Although the refrigerant pressure of the high-pressure side becomes larger than the critical pressure of the refrigerant when the air-conditioning load is increased in summer and the like, the refrigerant pressure of the high-pressure side can become larger than the critical pressure of the refrigerant in other seasons such as fall, winter, spring, and rainy season. Moreover, although the refrigerant pressure of the high-pressure side becomes larger than the critical pressure of the refrigerant, the refrigerant pressure of the high-pressure side can be smaller than the critical pressure of the refrigerant.

Such changes and modifications are to be understood as being within the scope of the present invention as defined by the appended claims.

What is claimed is:

1. An air-conditioner with a vapor-compression refrigerant cycle comprising:
  a compressor for sucking and compressing refrigerant and for variably controlling an amount of the refrigerant discharged from the compressor per unit of time;
  a radiator for radiating heat and cooling high-pressure refrigerant compressed by the compressor;
  an evaporator for cooling air blowing into a passenger compartment of a vehicle by evaporating the refrigerant;
  an ejector having a nozzle with an opening degree of a throttle for jetting the refrigerant at high speed by decompressing and expanding the high-pressure refrigerant at the nozzle so that low-pressure refrigerant is circulated by jetting the refrigerant and that suction pressure of the compressor is increased by converting expansion energy to pressure energy; and
  a separator for separating the refrigerant jetted from the ejector into gas refrigerant and liquid refrigerant so that the gas refrigerant is supplied to a suction side of the compressor and the liquid refrigerant is supplied to the evaporator,
  wherein the opening degree of the throttle of the nozzle in the ejector becomes larger so as to increase a cooling performance of the air-conditioner when the amount of the refrigerant discharged from the compressor is smaller than a maximum amount of the refrigerant discharged from the compressor.

2. The air-conditioner according to claim 1, wherein the opening degree of the throttle of the nozzle in the ejector becomes larger, and simultaneously the amount of the refrigerant discharged from the compressor is increased so as to increase a cooling performance of the air-conditioner when the amount of the refrigerant discharged from the compressor is smaller than the maximum amount of the refrigerant discharged from the compressor.

3. The air-conditioner according to claim 1, wherein the amount of the refrigerant discharged from the compressor is increased after the opening degree of the throttle of the nozzle in the ejector becomes larger so as to increase a cooling performance of the air-conditioner when the amount of the refrigerant discharged from the compressor is smaller than the maximum amount of the refrigerant discharged from the compressor.

4. The air-conditioner according to claim 1, wherein the opening degree of the throttle of the nozzle in the ejector is increased after the amount of the refrigerant discharged from the compressor is increased so as to increase a cooling performance of the air-conditioner when the amount of the refrigerant discharged from the compressor is smaller than the maximum amount of the refrigerant discharged from the compressor.

5. The air-conditioner according to claim 1, wherein the compressor controls the amount of the refrigerant discharged from the compressor variably by controlling the amount of the refrigerant discharged from the compressor by one rotation cycle of a shaft in the compressor,
  wherein the amount of the refrigerant discharged from the compressor by one rotation cycle of the shaft in the compressor increases so as to increase the amount of the refrigerant discharged from the compressor, and
  wherein the amount of the refrigerant discharged from the compressor by one rotation cycle of the shaft in the compressor decreases so as to reduce the amount of the refrigerant discharged from the compressor.

6. The air-conditioner according to claim 1, wherein the opening degree of the throttle of the ejector is controlled such that refrigerant pressure of a high-pressure side becomes a target pressure, which is determined based on refrigerant temperature of an outlet side of the radiator.

7. The air-conditioner according to claim 1, wherein refrigerant pressure of a high-pressure side can become larger than a critical pressure of the refrigerant.

8. The air-conditioner according to claim 1, wherein the refrigerant is carbon dioxide.

9. The air-conditioner according to claim 1, wherein, when a defog mode is selected, the cooling performance of the air-conditioner is increased more than that in a case before the defog mode is selected, the defog mode providing to blow an air-conditioning air toward a windshield of the vehicle.

10. The air-conditioner according to claim 1, further comprising:
an air-conditioner casing for an air passage; and
a humidity sensor for detecting humidity of the air being sucked into the air-conditioner casing,
wherein, when the humidity sensor detects the humidity larger than a predetermined humidity, the cooling performance of the air-conditioner is increased more than that in a case where the humidity sensor detects the humidity equal to or smaller than the predetermined humidity.

11. The air-conditioner according to claim 1,
wherein the refrigerant is freon, hydrocarbon, hydro chloro carbon, or hydro fluoro carbon.

12. The air-conditioner according to claim 1,
wherein the compressor controls the amount of the refrigerant discharged from the compressor variably by controlling a rotation speed of the compressor.

13. The air-conditioner according to claim 1,
wherein refrigerant pressure of a high-pressure side is smaller than a critical pressure of the refrigerant.

14. A method for operating an air-conditioner with a vapor-compression refrigerant cycle, which includes a compressor for sucking and compressing refrigerant and for variably controlling an amount of the refrigerant discharged from the compressor per unit of time, a radiator for radiating heat and cooling high-pressure refrigerant compressed by the compressor, an evaporator for cooling air blowing into a passenger compartment of a vehicle by evaporating the refrigerant, an ejector having a nozzle with an opening degree of a throttle for jetting the refrigerant at high speed by decompressing and expanding the high-pressure refrigerant at the nozzle so that low-pressure refrigerant is circulated by jetting the refrigerant and that suction pressure of the compressor is increased by converting expansion energy to pressure energy, and a separator for separating the refrigerant jetted from the ejector into gas refrigerant and liquid refrigerant so that the gas refrigerant is supplied to a suction side of the compressor and the liquid refrigerant is supplied to the evaporator, the method comprising the steps of:
enlarging the opening degree of the throttle of the nozzle in the ejector so as to increase a cooling performance of the air-conditioner; and
increasing an amount of the refrigerant discharged from the compressor.

15. The method according to claim 14,
wherein the amount of the refrigerant discharged from the compressor is smaller than a maximum amount of the refrigerant discharged from the compressor.

16. The method according to claim 14,
wherein the step of enlarging the opening degree of the throttle of the nozzle is performed before the step of increasing the amount of the refrigerant discharged from the compressor.

17. The method according to claim 14,
wherein the step of enlarging the opening degree of the throttle of the nozzle is performed after the step of increasing the amount of the refrigerant discharged from the compressor.

18. The method according to claim 14,
wherein the step of enlarging the opening degree of the throttle of the nozzle and the step of increasing the amount of the refrigerant discharged from the compressor are performed simultaneously.

19. The method according to claim 14,
wherein the refrigerant is carbon dioxide, freon, hydrocarbon, hydro chloro carbon, or hydro fluoro carbon.

20. The method according to claim 14, wherein the air-conditioner further includes an air-conditioner casing for an air passage, and a humidity sensor for detecting humidity of the air being sucked into the air-conditioner casing, the method further comprising the step of:
increasing the cooling performance of the air-conditioner, when the humidity sensor detects the humidity larger than a predetermined humidity,
wherein the increase of the cooling performance of the air-conditioner is larger than that in a case where the humidity sensor detects the humidity equal to or smaller than the predetermined humidity.

* * * * *